US012669268B2

(12) United States Patent
Johnson

(10) Patent No.: US 12,669,268 B2
(45) Date of Patent: Jun. 30, 2026

(54) CLOSED WELL LOOP FOR A GEOTHERMAL SYSTEM

(71) Applicant: Schlumberger Technology Corporation, Sugar Land, TX (US)

(72) Inventor: Ashley Bernard Johnson, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 106 days.

(21) Appl. No.: 18/824,954

(22) Filed: Sep. 5, 2024

(65) Prior Publication Data

US 2025/0093076 A1      Mar. 20, 2025

Related U.S. Application Data

(60) Provisional application No. 63/583,866, filed on Sep. 20, 2023.

(51) Int. Cl.
F24T 10/15          (2018.01)
F16L 59/065        (2006.01)
F24T 10/17          (2018.01)

(52) U.S. Cl.
CPC ............ F24T 10/15 (2018.05); F16L 59/065 (2013.01); F24T 10/17 (2018.05); Y02E 10/10 (2013.01)

(58) Field of Classification Search
CPC . F24T 10/10; F24T 10/13; F24T 10/15; F24T 10/17; F24T 10/20; F24T 10/30;
(Continued)

(56) References Cited

U.S. PATENT DOCUMENTS

| 2011/0232858 A1* | 9/2011 | Hara ...................... F24T 10/17 |
| | | 165/45 |
| 2021/0048229 A1* | 2/2021 | Niemi ................. F28D 20/0052 |
| 2023/0045716 A1 | 2/2023 | Normann et al. |

FOREIGN PATENT DOCUMENTS

| CN | 103453571 B | 10/2015 |
| CN | 109798091 A | 5/2019 |
| CN | 114110725 A | 3/2022 |

OTHER PUBLICATIONS

Development and Application of Insulated Drill Pipe for High Temperature—High Pressure Drilling, National Energy Technology Laboratory, Oct. 1, 2006, 3 Pages.
(Continued)

*Primary Examiner* — Loren C Edwards
(74) *Attorney, Agent, or Firm* — Jeffrey D. Frantz

(57) ABSTRACT

A closed well loop is provided for a geothermal system. The closed well loop includes a well (single well) that traverses a subterranean formation to extract heat from the subterranean formation. The well includes a section having an inner pipe that is supported inside an outer pipe in a pipe-in-pipe arrangement. The inner pipe has an interior flow channel that defines a first flow path for circulating working fluid, and the annulus between the inner pipe and the outer pipe defines a second flow path for the circulating working fluid. The well can be configured to extract heat from the subterranean formation and transfer heat to the circulating working fluid that flows in the first and second flow paths. The inner pipe can include a thermally-insulative piping system that reduces the amount of heat transferred from the circulating fluid that flows in the first and second flow paths within the well.

7 Claims, 12 Drawing Sheets

(58) Field of Classification Search
CPC ........ F16L 59/065; Y02E 10/10; F03G 4/029;
F03G 7/04; E21B 43/305
See application file for complete search history.

(56) References Cited

OTHER PUBLICATIONS

Vacuum Insulated Tubing, Retrieved from the internet: https://www.
tmk-group.com/VIT, Retrieved on Jan. 10, 2025, 6 Pages.

* cited by examiner transfer of thermal energy (heat) from subterranean formation to working fluid

11 geothermal loop

18 closed well loop                                                    22 hot
side
heat exchanger(s)                    geothermal
process cold
side

16′

20                                        14′ annulus between                                          injection manifold
inner pipe 309                                           (inner pipe) 309
and outer pipe
305 transfer of thermal energy (heat) from
subterranean formation to working fluid

309 thermal-insulating
material  321

305

309 thermal-insulating
material 323

305 vacuum insulated
tubing for injection
manifold (inner
pipe) 309

305

CLOSED WELL LOOP FOR A GEOTHERMAL SYSTEM

CROSS-REFERENCE TO RELATED APPLICATION(S)

The present disclosure claims priority from U.S. Provisional Appl. No. 63/583,866, filed on Sep. 20, 2023, entitled "CLOSED WELL LOOP FOR A GEOTHERMAL SYSTEM," herein incorporated by reference in its entirety.

FIELD

The present disclosure relates to geothermal systems having a closed well loop that extracts thermal energy (heat) from a subterranean formation.

BACKGROUND

Geothermal systems that employ a closed well loop are generating considerable interest. Typically, these system include an injection well and a production well that are connected by many multilateral loops. These multilateral loops are drilled from the parent injection and production wells and intersect at a far length. In most well plans, the multilateral loops extend parallel relative to one another and are sloped downwards. FIG. 1 shows a closed well loop having an injection well and a production well drilled from the same well pad with multilateral loops that extend parallel relative to one another and are sloped downwards. This is currently the preferred geometry for large scale geothermal systems.

FIG. 2 shows a prior art geothermal system 11 that includes a closed well loop (FIG. 1) operably coupled to a geothermal loop by one or more heat exchangers 18. The closed well loop includes one or more injection wells 14 and one or more production wells 16 that traverse a subterranean formation. Working fluid circulates in the closed well loop down the injection well(s) 14 and up the production well(s) 16 to extract thermal energy (heat) from the subterranean formation. Part of the injection well(s) 14 and the production well(s) 16 are configured to allow thermal energy (heat) from the subterranean formation to transfer to the working fluid that circulates in the closed well loop, which creates an increase in temperature between the working fluid that flows up the production well(s) and the working fluid that flows down the injection well(s) 14. The heat exchanger(s) 18 recovers the heat 20 transferred from the formation to the working fluid and uses this heat in the geothermal loop. The geothermal loop can include a geothermal process 22 that uses the heat for large scale heating or cooling, power generation, industrial/agricultural processes or other geothermal applications. The system can include one or more pumps (not shown) to circulate the working fluid in the closed well loop. The pump(s) can be located at the surface or possibly downhole (such as line shaft pumps or electrical submersible pumps).

The costs for planning and drilling the injection well, the production well, and the multilateral loops that connect the injection and production wells can be prohibitive and deter or limit the implementation of such complex closed well loop geothermal systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A closed well loop is provided for a geothermal system. The closed well loop includes a well that traverses a subterranean formation to extract heat from the subterranean formation. The well includes a section having an inner pipe that is supported inside an outer pipe. The inner pipe can extend within the outer pipe in a pipe-in-pipe arrangement. In the pipe-in-pipe arrangement, the inner pipe has an interior flow channel that defines a first flow path for circulating working fluid, and the annulus between the inner pipe and the outer pipe defines a second flow path for the circulating working fluid.

In embodiments, the section having the pipe-in-pipe arrangement is a vertical section (or portion thereof) that extends from the surface toward the hot zone of the subterranean formation. The hot zone is typically located at a point at or near the bottom of the vertical section. One or more other parts of the well (such as one or more lateral sections that extend laterally and downward away from the vertical section, or a part of the vertical section itself) can be configured to extract heat from the subterranean formation and transfer heat to the circulating working fluid that flows in the first and second flow paths.

In embodiments, the first flow path defined by the interior flow channel of the inner pipe can be configured as an injection manifold that carries cooler circulating working fluid downward within the well from the surface toward the hot zone of the subterranean formation. The second flow path defined by the annulus between the inner pipe and the outer pipe can be configured as a production manifold that carries hotter circulating fluid, which has been heated by thermal energy extracted from the hot zone of the subterranean formation, upward within the well away from the hot zone of the subterranean formation toward the surface.

In other embodiments, the first flow path defined by the interior flow channel of the inner pipe can be configured as a production manifold that carries hotter circulating fluid, which has been heated by thermal energy extracted from the hot zone of the subterranean formation, upward within the well away from the hot zone of the subterranean formation toward the surface. The second flow path defined by the annulus between the inner pipe and the outer pipe can function as an injection manifold that carries cooler circulating working fluid downward within the well from the surface toward the hot zone of the subterranean formation.

In embodiments, the inner pipe of the pipe-in-pipe arrangement can include a thermally-insulative piping system that reduces the amount of heat transferred from the hotter circulating fluid to the cooler circulating fluid that flows in the first and second flow paths.

In one embodiment, the thermally-insulative piping system can include a continuous layer of thermally-insulating material applied to or otherwise disposed about the inner diameter surface of the inner pipe for at least part of the section. In this configuration, the thermally-insulating material is operably disposed between the first and second flow paths and reduces the amount of heat transferred from the hotter circulating fluid to the cooler circulating fluid that flows in the first and second flow paths.

In another embodiment, the thermally-insulative piping system can include a continuous layer of thermally-insulating material applied to or otherwise disposed about the outer diameter surface of the inner pipe for at least part of the section. In this configuration, the thermally-insulating material is operably disposed between the first and second flow paths and reduces the amount of heat transferred from the hotter circulating fluid to the cooler circulating fluid that flows in the first and second flow paths within the section.

In yet another embodiment, the thermally-insulative piping system can include vacuum insulated pipe that forms the inner pipe for at least part of the section. In this configuration, the thermally-insulating vacuum cavity of the vacuum insulated pipe is operably disposed between the first and second flow paths and reduces the amount of heat transferred from the hotter circulating fluid to the cooler circulating fluid that flows in the first and second flow paths.

In embodiments, the outer pipe of the pipe-in-pipe arrangement can include pipe that is part of the casing that lines a wellbore wall. Alternatively, the outer pipe of the pipe-in-pipe arrangement can include pipe that is offset radially from the casing or wellbore wall.

In another aspect, a closed well loop for a geothermal system is provided that includes a well that traverses a subterranean formation to extract heat from the subterranean formation. The well includes a vertical section with at least one lateral section that extends from the vertical section. The vertical section includes an inner pipe that is supported inside an outer pipe in a pipe-in-pipe arrangement. The inner pipe has an interior flow channel that defines a first flow path for circulating working fluid. An annulus between the inner pipe and the outer pipe defines a second flow path for the circulating working fluid. The inner pipe includes a thermally-insulative piping system that reduces the amount of heat transferred from the hotter circulating fluid to the cooler circulating fluid that flows in the first and second flow paths within the well.

In embodiments, the at least one lateral section extends laterally and downward away from the vertical section. At least part of the at least one lateral section can be configured to support convective circulation of the circulating fluid.

In embodiments, the inner pipe can extend to a depth in the vertical section below intersection of the at least one lateral section and the vertical section.

In embodiments, the at least one lateral section can have a toe segment that is located at, or extends to, a depth below a bottom of the vertical section.

In embodiments, at least one lateral injection manifold can be configured to extend laterally and downward from the vertical section and intersects the toe segment of a corresponding lateral section.

In embodiments, an isolation packer can be disposed within the vertical section. The at least one lateral injection manifold can be configured to intersect the vertical section below the isolation packer. The at least one lateral section can be configured to intersect the vertical section above the isolation packer.

In embodiments, the thermally-insulative piping system can include a continuous layer of thermally-insulating material applied to or otherwise disposed about the inner diameter surface of the inner pipe for at least part of the vertical section.

In embodiments, the thermally-insulative piping system can include a continuous layer of thermally-insulating material applied to or otherwise disposed about the outer diameter surface of the inner pipe for at least part of the vertical section.

In embodiments, the thermally-insulative piping system can include a vacuum insulated pipe that forms the inner pipe for at least part of the vertical section.

In embodiments, the first flow path defined by the interior flow channel of the inner pipe can be configured to carry cooler circulating working fluid downward within the well from the surface toward the hot zone of the subterranean formation. The second flow path defined by the annulus between the inner pipe and the outer pipe can be configured to carry hotter circulating fluid, which has been heated by thermal energy extracted from the hot zone of the subterranean formation, upward within the well away from the hot zone of the subterranean formation toward the surface.

In embodiments, the outer pipe can include pipe that is part of casing that lines the wellbore wall of the vertical section.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

<div align="center">DETAILED DESCRIPTION</div>

Figure 1:
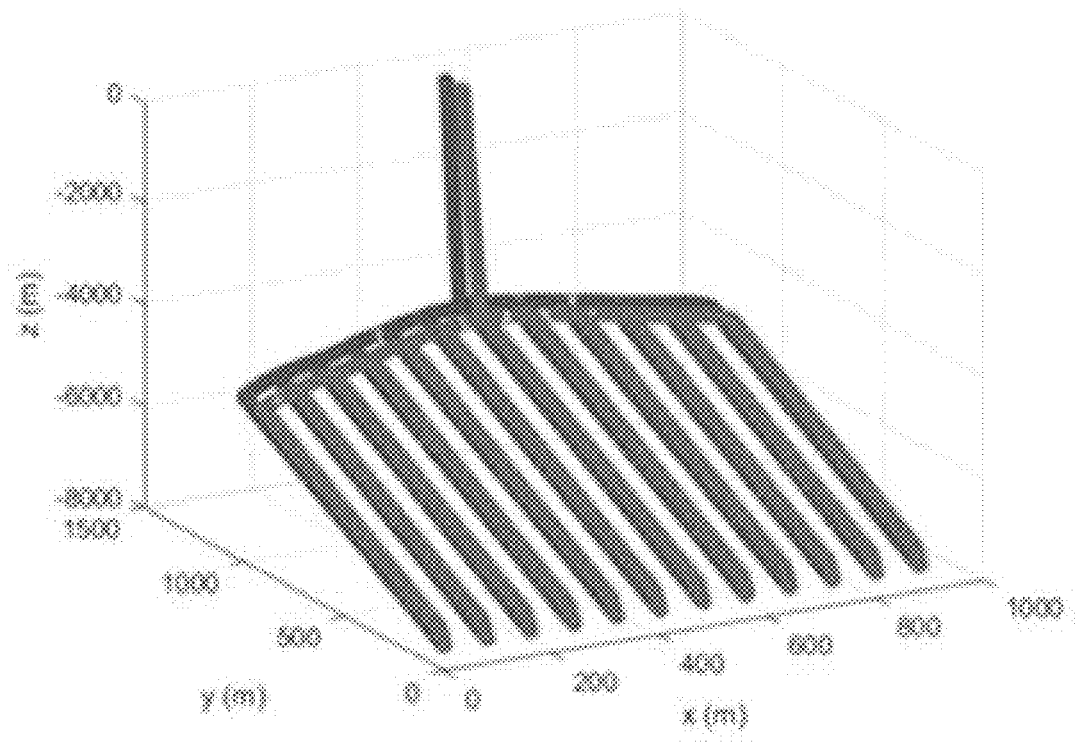
FIG. 1 is a schematic diagram of a prior art closed well loop having an injection well and a production well drilled from the same well pad with multilateral loops that extend parallel relative to one another and are sloped downwards.

The particulars shown herein are by way of example and for purposes of illustrative discussion of the embodiments of the subject disclosure only and are presented in the course of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

"Pipe" or "piping" as used herein refers to pipe, tubing or other conduit that carries working fluid in a geothermal well. The "pipe" or "piping" can be formed from steel, plastic or a composite material depending on the application. The "pipe" or "piping" can also be rigid or flexible depending on the application. The "pipe" or "piping" can be a single piece of conduit or multiple sections of conduit that are joined together depending on the application.

Embodiments of the present disclosure relate to geothermal systems that circulate working fluid in a closed well loop formed by a single well that traverses a subterranean formation to extract heat from the subterranean formation. The well includes a section having an inner pipe that is supported inside an outer pipe. The inner pipe can extend within the outer pipe in a pipe-in-pipe arrangement. In the pipe-in-pipe arrangement, the inner pipe has an interior flow channel that defines a first flow path for circulating working fluid, and the annulus between the inner pipe and outer pipe defines a second flow path for the circulating working fluid.

In embodiments, the section having the pipe-in-pipe arrangement is a vertical section (or portion thereof) that extends from the surface toward the hot zone of the subterranean formation. The hot zone is typically located at a point at or near the bottom of the vertical section. One or more parts of the well (such as one or more lateral sections that extend laterally and downward away from the vertical section, or a part of the vertical section itself) can be configured to extract heat from the subterranean formation and transfer heat to the circulating working fluid that flows in the first and second flow paths.

In embodiments, the first flow path defined by the interior flow channel of the inner pipe can be configured as an injection manifold that carries cooler circulating working fluid downward within the well from the surface toward the hot zone of the subterranean formation; and, the second flow path defined by the annulus between the inner pipe and the outer pipe can be configured as a production manifold that carries hotter circulating fluid, which has been heated by thermal energy extracted from the hot zone of the subterranean formation, upward within the well away from the hot zone of the subterranean formation toward the surface.

In other embodiments, the first flow path defined by the interior flow channel of the inner pipe can be configured as a production manifold that carries hotter circulating fluid, which has been heated by thermal energy extracted from the hot zone of the subterranean formation, upward within the well away from the hot zone of the subterranean formation toward the surface; and, the second flow path defined by the annulus between the inner pipe and the outer pipe can be configured as an injection manifold that carries cooler circulating working fluid downward within the well from the surface toward the hot zone of the subterranean formation.

In embodiments, the inner pipe can include a thermally-insulative piping system that reduces the amount of heat transferred from the hotter circulating fluid to the cooler circulating fluid that flows in the first and second flow paths.

In one embodiment, the thermally-insulative piping system can include a continuous layer of thermally-insulating material applied to or otherwise disposed about the inner diameter surface of the inner pipe for at least part of the section. In this configuration, the thermally-insulating material is operably disposed between the first and second flow paths and reduces the amount of heat transferred from the hotter circulating fluid to the cooler circulating fluid that flows in the first and second flow paths.

In another embodiment, the thermally-insulative piping system can include a continuous layer of thermally-insulating material applied to or otherwise disposed about the outer diameter surface of the inner pipe for at least part of the section. In this configuration, the thermally-insulating material is operably disposed between the first and second flow paths and reduces the amount of heat transferred from the hotter circulating fluid to the cooler circulating fluid that flows in the first and second flow paths.

In yet another embodiment, the thermally-insulative piping system can include vacuum insulated pipe that forms the inner pipe for at least part of the section. In this configuration, the thermally-insulating vacuum cavity of the vacuum insulated pipe is operably disposed between the first and second flow paths and reduces the amount of heat transferred from the hotter circulating fluid to the cooler circulating fluid that flows in the first and second flow paths.

Figure 3:
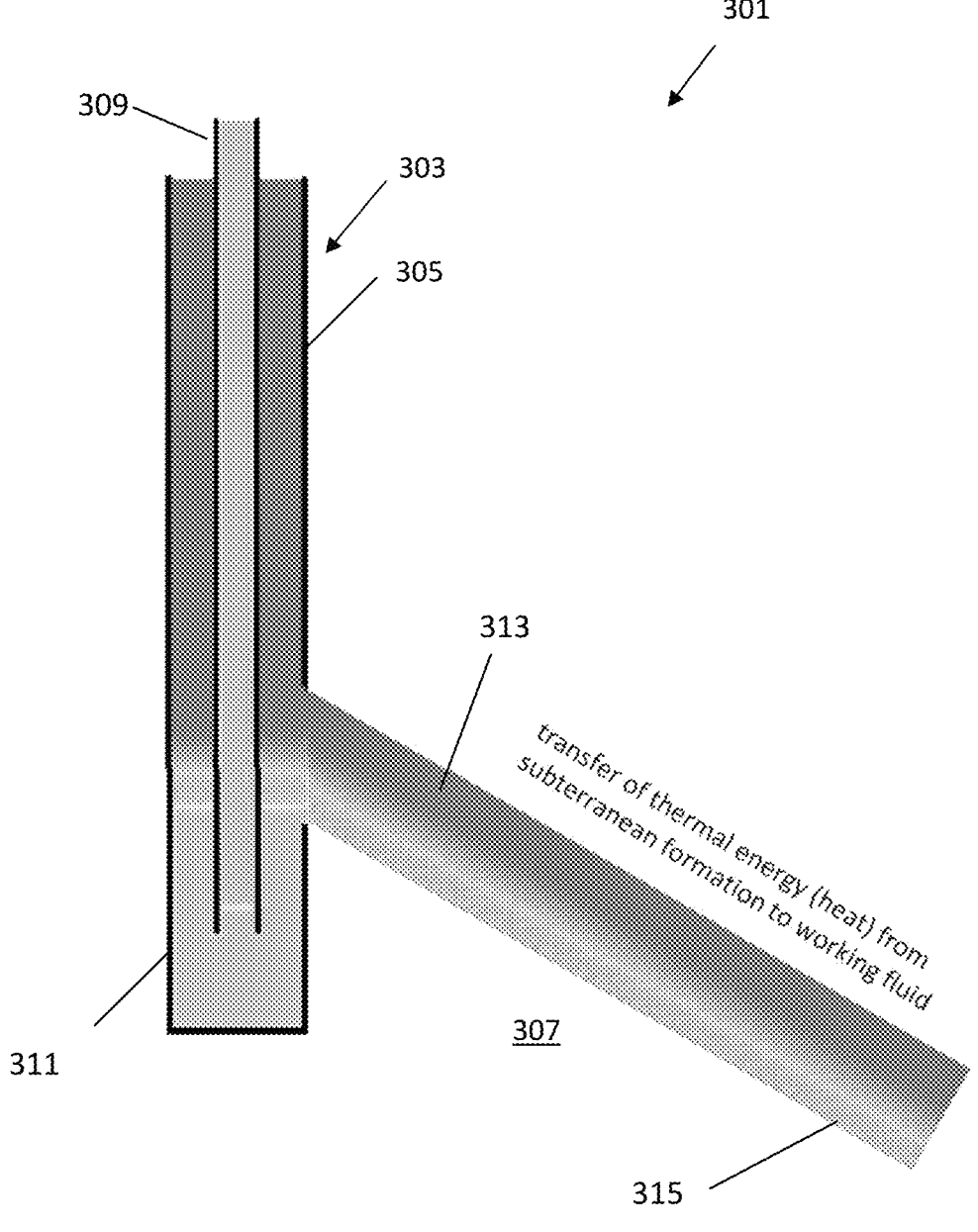
FIG. 3 is a schematic diagram of an embodiment of a closed well loop according to the present disclosure.

FIG. 3 is a schematic diagram of an embodiment of a closed well loop 301 formed by a single well according to the present disclosure. In this embodiment, a vertical section 303 is provided with an outer pipe 305 that is deployed in a vertical borehole that extends from the surface into or near the hot zone of the subterranean formation 307. An injection manifold (inner pipe) 309 extends from the top of the vertical section 303 to a point at or near the bottom 311 of the vertical section 303. A lateral section 313 extends from the vertical section 303 at a location offset vertically above the bottom 311 of the vertical section 303 and above the bottom of the injection manifold (inner pipe) 309 as shown. The lateral section 313 extends generally laterally and downward away from the vertical section 303 to a toe segment 315. In embodiments, the toe segment 315 can be located at (or extend to) a depth below depth of the bottom 311 of the vertical section 303 as shown. The injection manifold (inner pipe) 309 is supported inside the outer pipe 305 of the vertical section 303. The injection manifold (inner pipe) 309 extends within the outer pipe 305 from the surface toward the hot zone of the subterranean formation 307 in a pipe-in-pipe arrangement. In this pipe-in-pipe arrangement, the injection manifold (inner pipe) 309 has an interior flow channel that defines a first flow path for a working fluid, and the annulus between the injection manifold (inner pipe) 309 and the outer piper 305 defines a second flow path for working fluid. The lateral section 313 can be configured to allow heat from the subterranean formation to transfer to the working fluid that flows therein.

In embodiments, the inner pipe 309 can extend to a depth in the vertical section 303 below the intersection of the lateral section 313 and the vertical section 303 as shown.

In embodiments, the outer pipe 305 can include pipe that is part of the casing that lines the wellbore wall of the vertical section 303 as shown in FIG. 3. Alternatively, the outer pipe 305 can include pipe that is offset radially from the casing or wellbore wall of the vertical section 303.

FIG. 3 shows only one lateral section 313 for illustrative purposes only. Embodiments can employ a plurality of lateral sections that extend from the vertical section 303 in a manner similar to the single lateral section 313 shown in FIG. 3. In embodiments, the inner pipe 309 can extend to a depth in the vertical section 303 below the intersection of the plurality of lateral sections and the vertical section 303.

The working fluid is circulated in the well such that it flows down the first flow path defined by the interior flow channel of the injection manifold (inner pipe) 309 and exits near the bottom 311 of the vertical section 303. Convection will drive the cooler fluid to flow downward toward the toe 315 of the lateral section 313. Thermal energy (heat) from the surrounding formation 307 will transfer to the circulating fluid in the lateral section 313, and convection will drive hotter fluid upward toward the vertical section 303. In this configuration, the upper part of the lateral section 313 can be hotter than the bottom part of the lateral section due to such convection. This temperature difference can be attributed to the "Boycott Effect." The working fluid flows upward in the second flow path defined by the annulus between the injection manifold (inner pipe) 309 and the outer pipe 305 for production from the geothermal well at the surface. Because the working fluid enters at the lower side of the vertical section 303, there will be some segmentation between the warm fluid at the top of the vertical section 303 and the cold fluid at the bottom 311 of the vertical section 303 such that the single well closed loop will produce heat. The limit of the heat produced will be due to the mixing at the interface between the hot and cold fluids.

Figure 6:
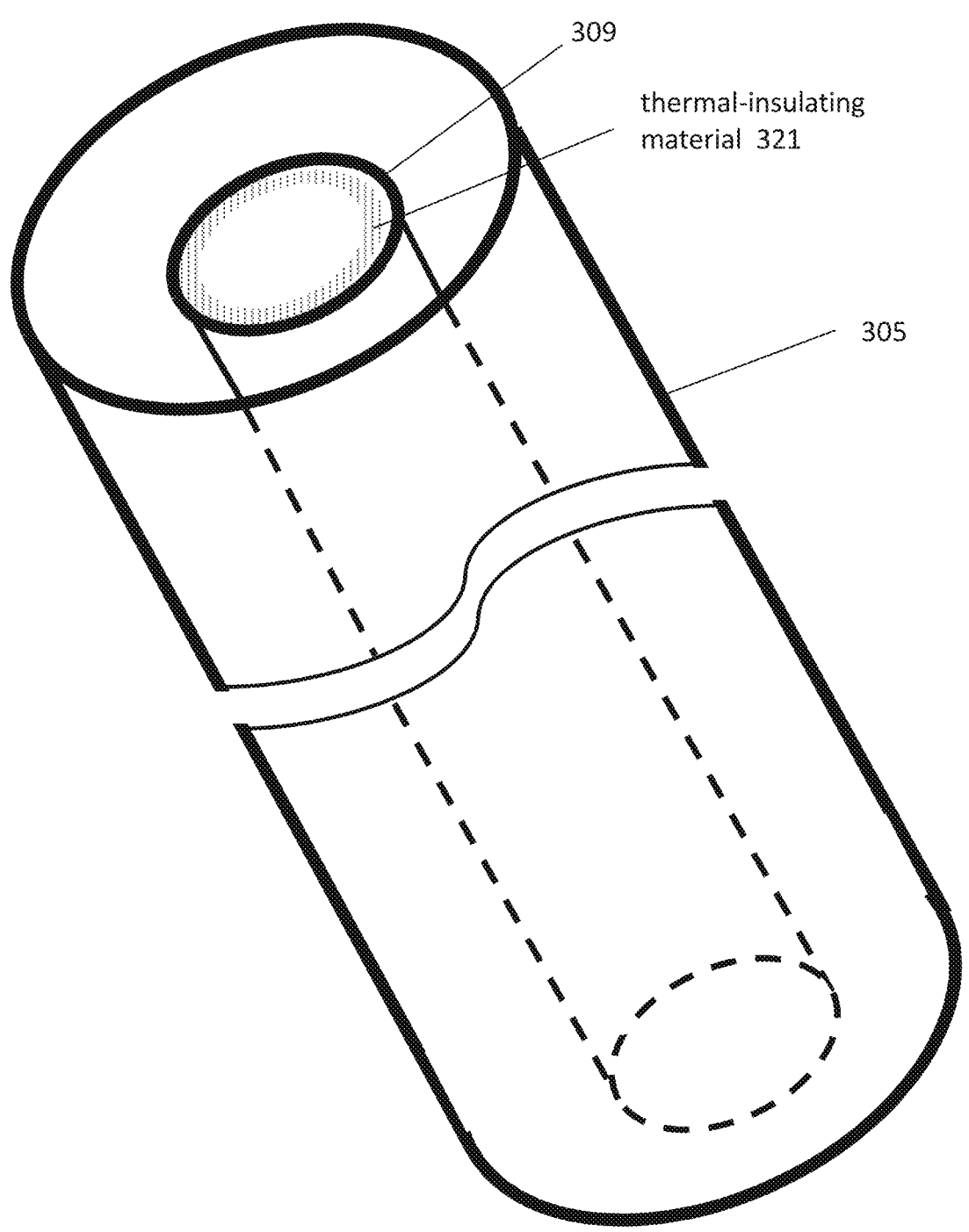
FIGS. 6, 7 and 8 are schematic diagrams of thermally-insulative piping systems that can embody at least part of the inner pipe of a section of a closed well loop according to the present disclosure; the thermally-insulative piping system of FIG. 6 includes a continuous layer of thermally-insulating material applied to or otherwise disposed about the inner diameter surface of the inner pipe for at least part of the section; the thermally-insulative piping system of FIG. 7 includes a continuous layer of thermally-insulating material applied to or otherwise disposed about the outer diameter surface of the inner pipe for at least part of the section; and the thermally-insulative piping system of FIG. 8 includes a vacuum-insulated pipe that forms the inner pipe for at least part of the section.

A continuous layer of thermally-insulating material 321 can be applied to or otherwise disposed about the inner diameter surface of the injection manifold (inner pipe) 309 as shown in FIG. 6 for at least part of the vertical section 303. In this configuration, the thermally-insulating material 321 is operably disposed between the first and second flow paths and reduces the amount of heat transferred from the hotter circulating fluid to the cooler circulating fluid that flows in the first and second flow paths within the well.

Figure 7:
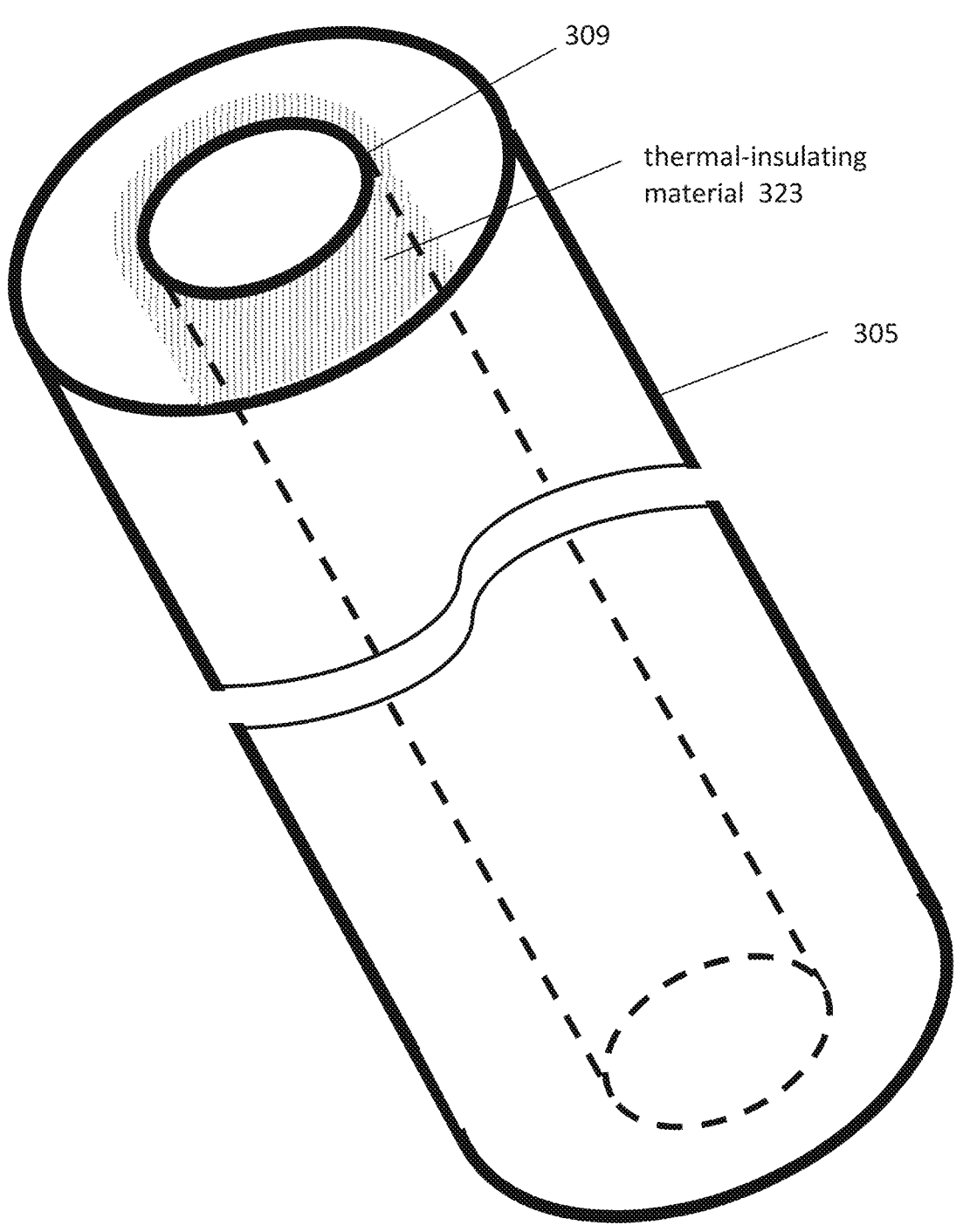

Alternatively, a continuous layer of thermally-insulating material 323 can be applied to or otherwise disposed about the outer diameter surface of the injection manifold (inner pipe) 309 as shown in FIG. 7 for at least part of the vertical section 303. In this configuration, the thermally-insulating material 323 is operably disposed between the first and second flow paths and reduces the amount of heat transferred from the hotter circulating fluid to the cooler circulating fluid that flows in the first and second flow paths within the well.

In embodiments, the thermally-insulating material 321 or 323 can include a number of composite materials, in a non-limiting example, a polymer or polymer matrix. The thermally-insulating material 321 or 323 may incorporate a fiber, notably glass or carbon to increase strength. The thermally-insulating material 321 or 323 may also include a powder, in a non-limiting example, tungsten powder, or hollow glass spheres, to improve durability and wear resistance. The thermally-insulating material 321 or 323 may also be a solid loaded elastomer.

In embodiments, the continuous layer of thermally-insulating material (321 or 323) can be applied to or otherwise disposed about the inner diameter surface (or the outer diameter surface) of the injection manifold (inner pipe) 309 for at least part of the injection manifold (inner pipe) 309 by methods which include injection molding, spray coating or chemical bonding the polymer structure to the load bearing metallic element.

Figure 8:
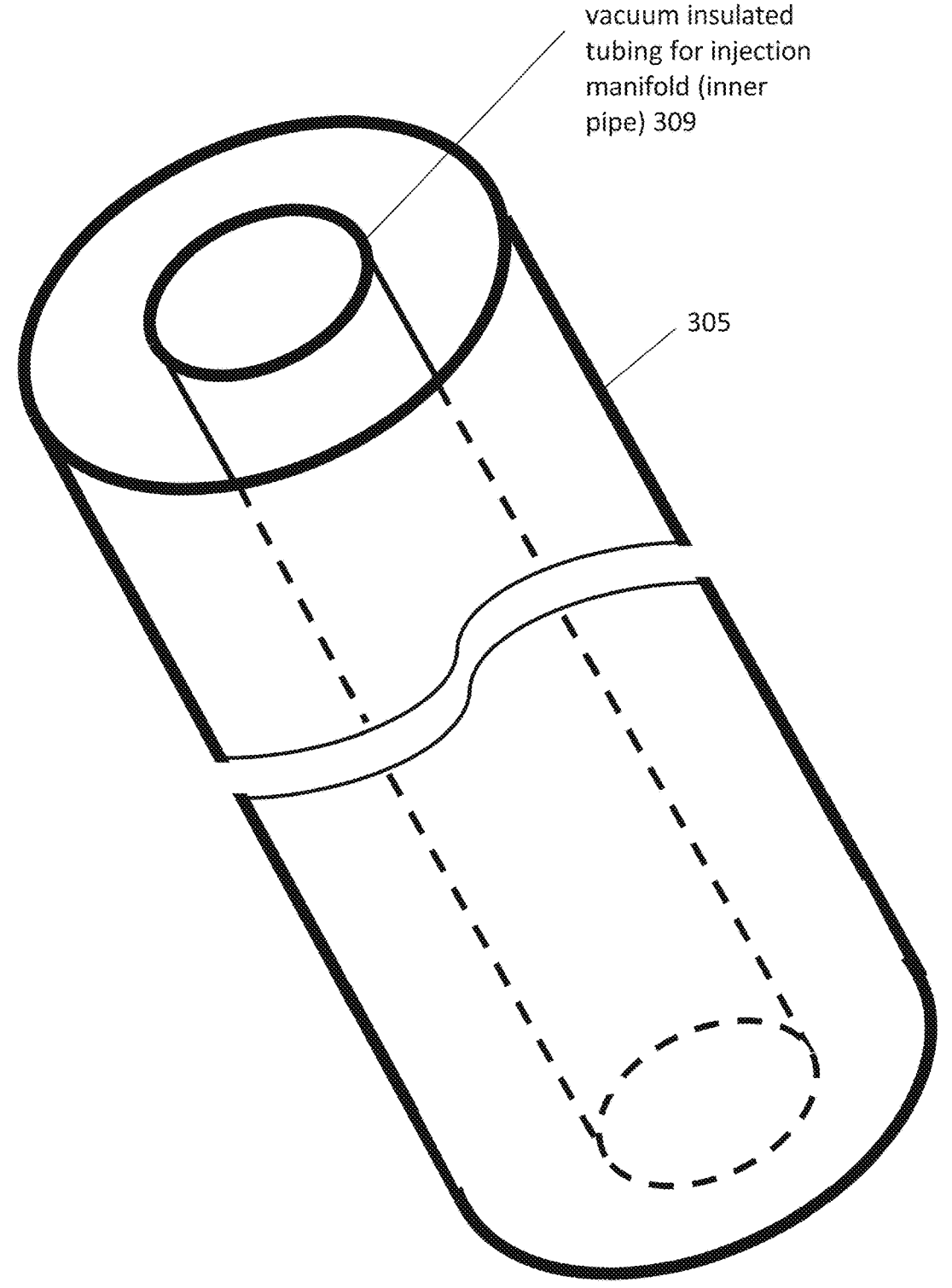

Alternatively, the injection manifold (inner pipe) 309 of FIG. 3 can be realized by vacuum insulated tubing or pipe as shown in FIG. 8 for at least part of the vertical section 303. The vacuum insulated tubing or pipe employs a set of concentric pipes or tubes (outer and inner) with a thermally-insulating vacuum cavity between them. The concentric pipes or tubes can be formed from steel, plastic, or a composite material. In this configuration, the thermally-insulating vacuum cavity of the vacuum insulated pipe is operably disposed between the first and second flow paths and reduces the amount of heat transferred from the hotter circulating fluid to the cooler circulating fluid that flows in the first and second flow paths within the well.

Figure 2:
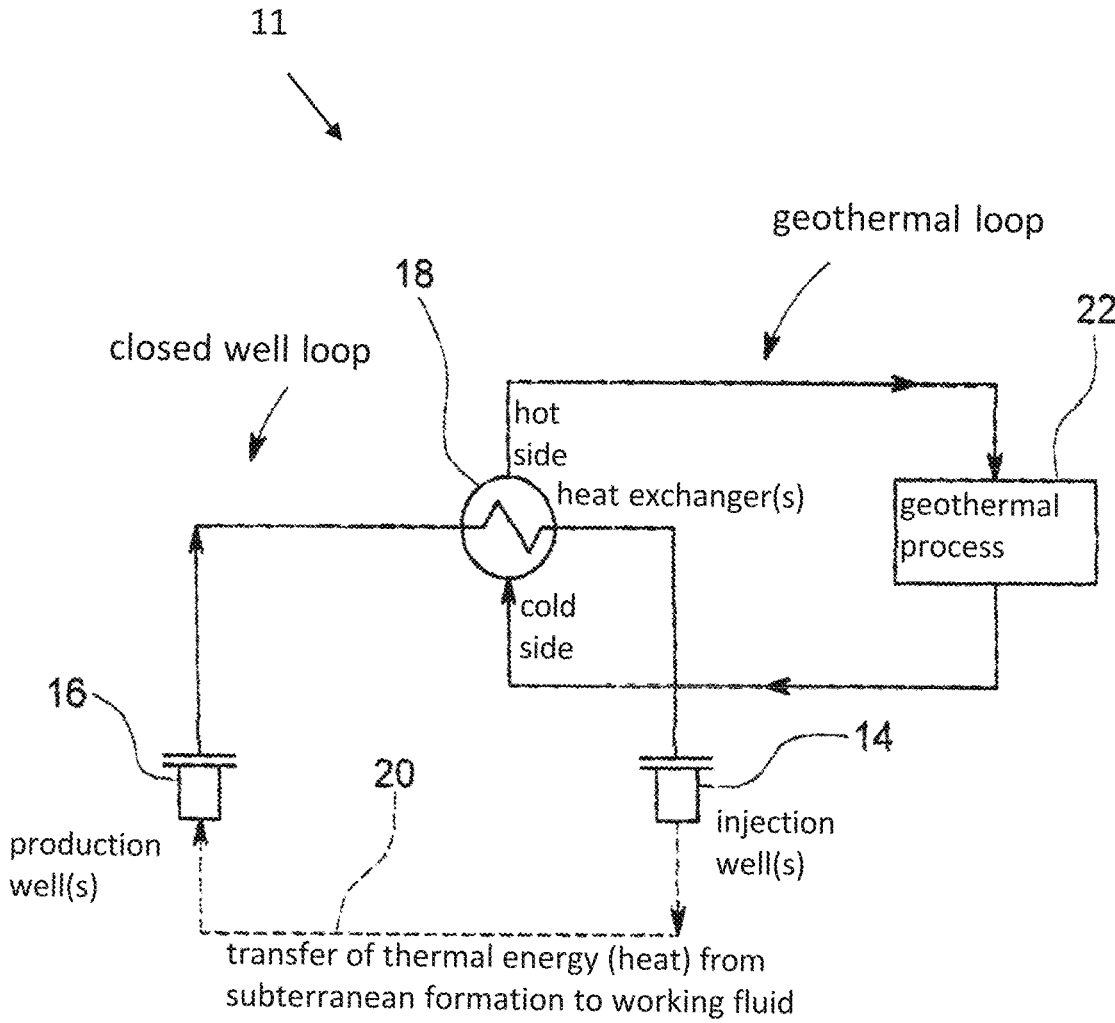
FIG. 2 is a schematic diagram of a prior art geothermal system that includes a closed well loop (see FIG. 1) operably coupled to a geothermal loop by one or more heat exchangers.
Figure 4:
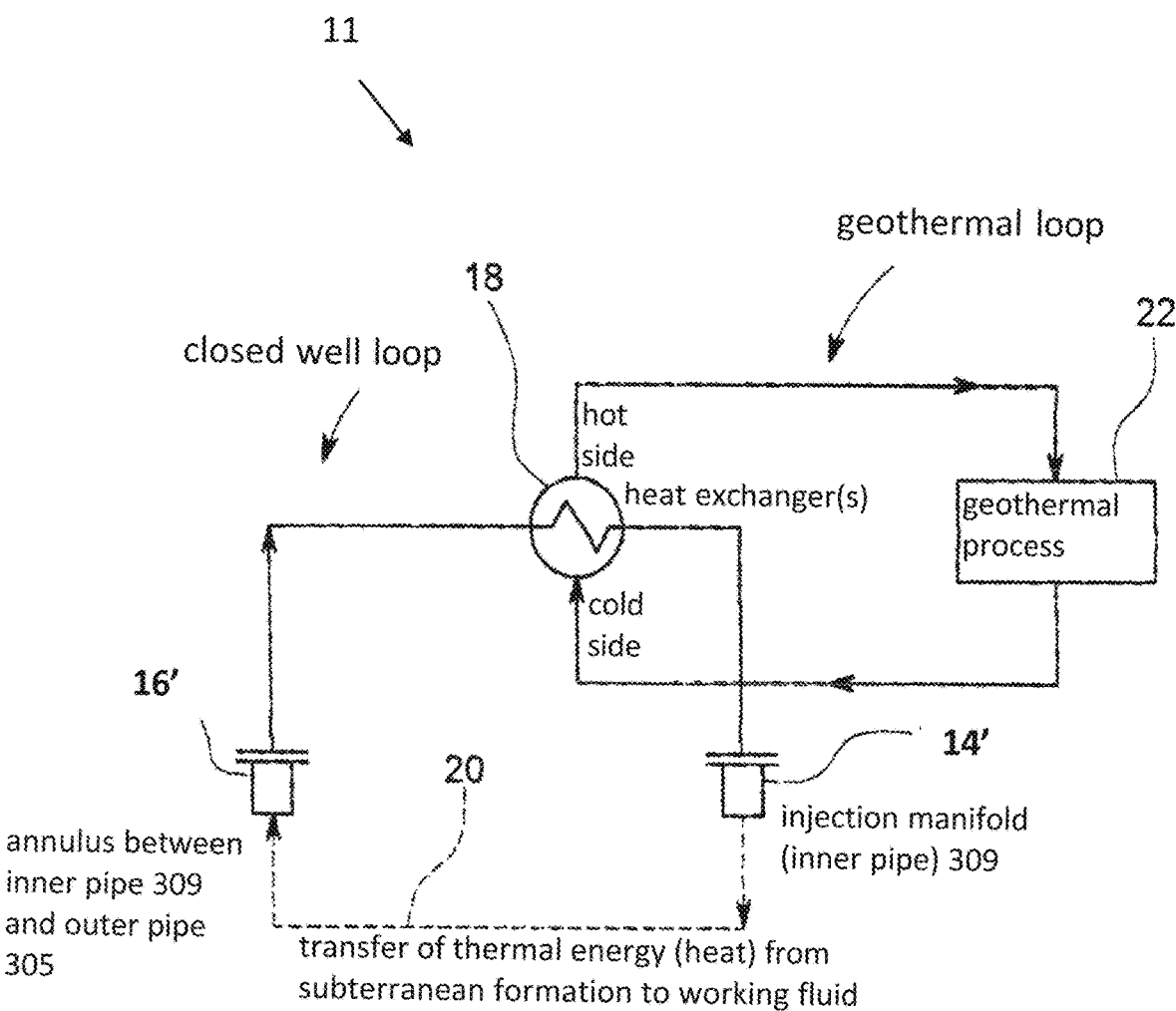
FIG. 4 is a schematic diagram of a geothermal system that includes the closed well loop of FIG. 3 operably coupled to a geothermal loop by one or more heat exchangers.

The closed well loop of FIG. 3 can be part of a geothermal system shown in FIG. 4, which is similar to the geothermal system described above with respect to FIG. 2.

In the embodiment of FIG. 3, the pipe-in-pipe arrangement is part of a vertical section where the wellbore is drilled in a generally vertical direction into the formation 307. Alternatively or additionally, the pipe-in-pipe arrangement as described herein can be part of a non-vertical section where the wellbore is drilled in a non-vertical direction into the formation 307, such as in a curved and/or horizontal trajectory.

Figure 5:
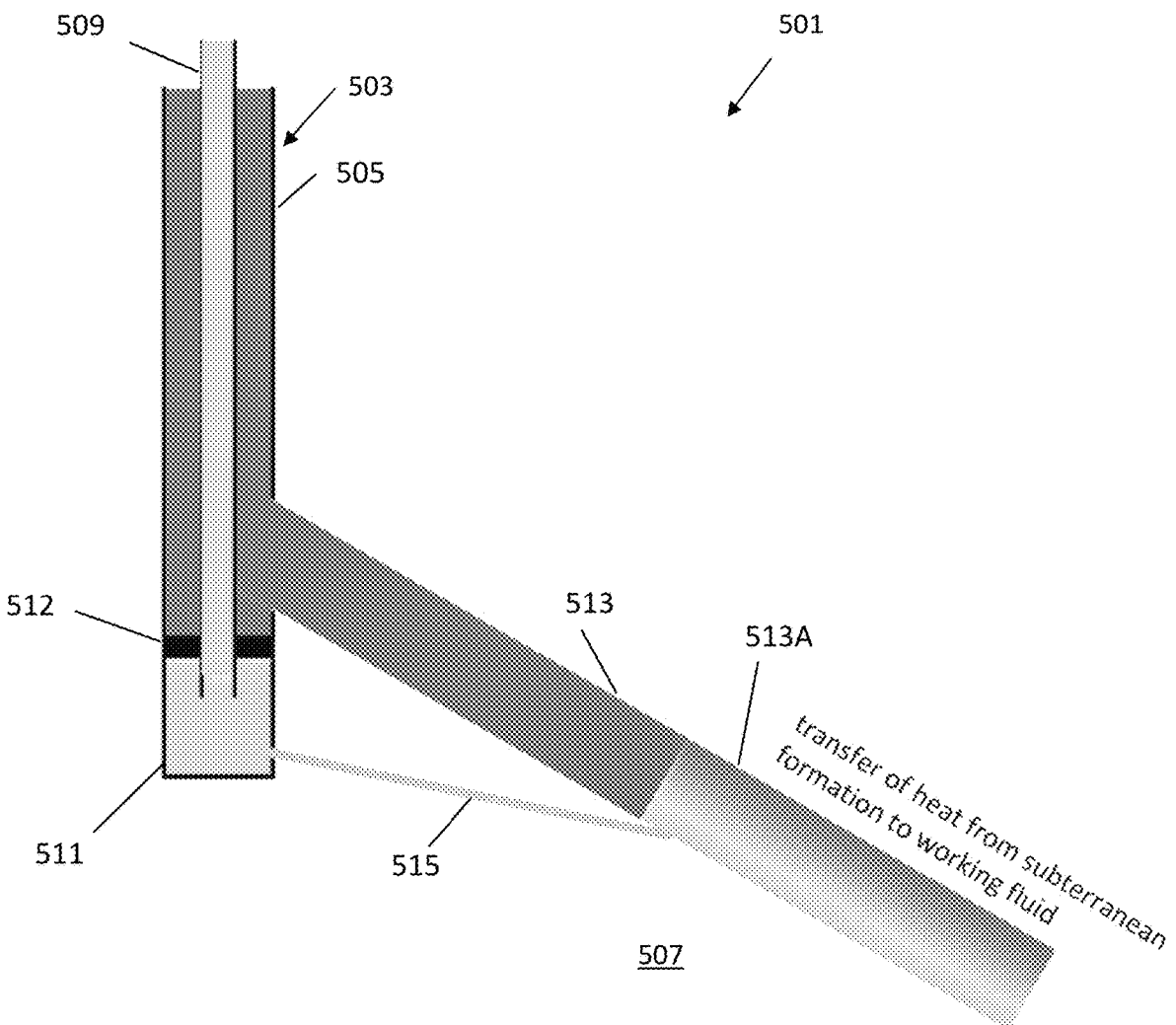
FIG. 5 is a schematic diagram of another embodiment of a closed well loop according to the present disclosure.

FIG. 5 is a schematic diagram of yet another embodiment of a closed well loop 501 formed by a single well according to the present disclosure. In this embodiment, a vertical section 503 is provided with an outer pipe 505 that is deployed in a vertical borehole that extends from the surface into or near the hot zone of the subterranean formation 507. An injection manifold (inner pipe) 509 extends from the top of the vertical section 503 to a point at or near the bottom 511 of the vertical section 503. An isolation packer 512 is disposed at or near the bottom of the injection manifold (inner pipe) 509 to isolate the bottom 511 of the vertical section 503 from the outer annulus of vertical section 503 above the isolation packer 512. One or more lateral production sections 513 extend from the vertical section 503 at a location offset vertically above the isolation packer 512. The one or more lateral production sections 513 extend generally laterally and downward away from the vertical section 503 to a toe segment 513A of the corresponding lateral production section 513 as shown. In embodiments, the toe section 513A can be located at (or extend to) a depth below depth of the bottom 511 of the vertical section 503 as shown. The injection manifold (inner pipe) 509 extends to a depth in the vertical section 503 below the isolation packer 512 and below the intersection of the lateral production section(s) 513 and the vertical section 503 as shown. The injection manifold (inner pipe) 509 is supported inside the outer pipe 505 of the vertical section 503. The injection manifold (inner pipe) 509 extends within the outer pipe 505 from the surface toward the hot zone of the subterranean formation 507 in a pipe-in-pipe arrangement. In this pipe-in-pipe arrangement, the injection manifold (inner pipe) 509 has an interior flow channel that defines a first flow path for working fluid, and the annulus between the inner pipe 509 and the outer pipe 505 defines a second flow path for working fluid. The toe segment(s) 513A of the lateral production section(s) can be configured to allow heat from the subterranean formation to transfer to the working fluid that flows therein.

FIG. 5 shows one lateral production section 513 and one lateral injection section 515 for illustrative purposes only. Embodiments can employ a plurality of lateral production sections and a corresponding plurality of lateral injection sections that extend from the vertical section of the well in a manner similar to the single lateral production section and single lateral injection section shown in FIG. 5. In embodiments, the inner pipe 509 can extend to a depth in the vertical section 503 below the isolation packer 512 and below intersection of the plurality of lateral sections and the vertical section 503.

In embodiments, the outer pipe 505 can include pipe that is part of the casing that lines the wellbore wall of the vertical section 503 as shown schematically in FIG. 5. Alternatively, the outer pipe 505 can include pipe that is offset radially from the casing or wellbore wall of the vertical section 503.

The working fluid is circulated in the well 501 such that it flows down the first flow path defined by the interior flow channel of the injection manifold (inner pipe) 509 and exits near the bottom region of the vertical section 503 that is isolated by the packer 512. The working fluid flows from the isolated bottom region of the vertical section 503 down the lateral injection section(s) 515 to the toe segment 513A of the corresponding lateral production section(s). Convection will drive the cooler fluid to flow downward along the toe segment 513A of the corresponding lateral production section 513. Thermal energy (heat) from the surrounding formation 507 will transfer to the circulating fluid in the toe segment 513A, and convection will drive hotter fluid upward toward the vertical section 503 and drive cooler fluid downward in the toe segment 513A. In this configuration, the upper part of the toe segment 513A can be hotter than the bottom part of the toe section 513A due to such convection. This temperature difference can be attributed to the "Boycott Effect." The working fluid flows upward in the second flow path defined by the annulus between the injection manifold (inner pipe) 509 and the outer pipe 505 for production from the geothermal well at the surface.

In embodiments, a continuous layer of thermally-insulating material can be applied to or otherwise disposed about the inner diameter surface of the injection manifold (inner pipe) 509 similar to the inner pipe 309 as shown in FIG. 6 for at least part of the vertical section 503. In this configuration, the thermally-insulating material is operably disposed between the first and second flow paths and reduces the amount of heat transferred from the hotter circulating fluid to the cooler circulating fluid that flows in the first and second flow paths within the well.

Alternatively, a continuous layer of thermally-insulating material can be applied to or otherwise disposed about the outer diameter surface of the injection manifold (inner pipe)

509 similar to the inner pipe 309 as shown in FIG. 7 for at least part of the vertical section 503. In this configuration, the thermally-insulating material is operably disposed between the first and second flow paths and reduces the amount of heat transferred from the hotter circulating fluid to the cooler circulating fluid that flows in the first and second flow paths within the well.

In embodiments, the thermally-insulating material can include a number of composite materials, typically a polymer or polymer matrix. The thermally-insulating material may incorporate a fiber, notably glass or carbon to increase strength. The thermally-insulating material may also include a powder to improve durability and wear resistance. The thermally-insulating material may also be a solid loaded elastomer.

In embodiments, the continuous layer of thermally-insulating material can be applied to or otherwise disposed about the inner diameter surface (or the outer diameter surface) of the injection manifold (inner pipe) 509 for at least part of the injection manifold (inner pipe) 509 by methods including injection molding, spray coating or chemical bonding the polymer structure to the load bearing metallic element.

Alternatively, the injection manifold (inner pipe) 509 of FIG. 5 can be realized by vacuum insulated piping similar to the inner pipe 309 as shown in FIG. 8 for at least part of the vertical section 503. Vacuum insulated piping employs a set of concentric pipes or tubes (outer and inner) with a thermally-insulating vacuum cavity between them. The concentric pipes or tubes can be formed from steel, plastic, or a composite material. In this configuration, the thermally-insulating vacuum cavity of the vacuum insulated piping is operably disposed between the first and second flow paths and reduces the amount of heat transferred from the hotter circulating fluid to the cooler circulating fluid that flows in the first and second flow paths within the well.

The closed well loop 501 of FIG. 5 can be part of a geothermal system shown in FIG. 4, which is similar to the geothermal system described above with respect to FIG. 2.

In the embodiment of FIG. 5, the pipe-in-pipe arrangement is part of a vertical section where the wellbore is drilled in a generally vertical direction into the formation 507. Alternatively or additionally, the pipe-in-pipe arrangement as described herein can be part of a non-vertical section where the wellbore is drilled in a non-vertical direction into the formation 507, such as in a curved and/or horizontal trajectory.

In the closed well loops of FIGS. 3 and 5, the first flow path defined by the interior flow channel of the inner pipe is configured as an injection manifold that carries cooler circulating working fluid downward within the well from the surface toward the hot zone of the subterranean formation; and the second flow path defined by the annulus between the inner pipe and the outer pipe is configured as a production manifold that carries hotter circulating fluid, which has been heated by thermal energy extracted from the hot zone of the subterranean formation, upward within the well away from the hot zone of the subterranean formation toward the surface. The thermally-insulating piping system can be operably disposed between the first and second flow paths and reduces the amount of heat transferred from the hotter circulating fluid to the cooler circulating fluid that flows in the first and second flow paths within the well.

In other embodiments, the first flow path defined by the interior flow channel of the inner pipe can be configured as a production manifold that carries hotter circulating fluid, which has been heated by thermal energy extracted from the hot zone of the subterranean formation, upward within the well away from the hot zone of the subterranean formation toward the surface; and, the second flow path defined by the annulus between the inner pipe and the outer pipe can be configured as an injection manifold that carries cooler circulating working fluid downward within the well from the surface toward the hot zone of the subterranean formation. The thermally-insulating piping system can be operably disposed between the first and second flow paths and reduces the amount of heat transferred from the hotter circulating fluid to the cooler circulating fluid that flows in the first and second flow paths within the well.

In embodiments, the lateral injection section(s) of the well can be drilled with coiled tubing to use tighter radius of curvature and reduced complexity. Furthermore, the lateral injection section(s) of the well can be drilled with a smaller diameter relative to the lateral production section(s) of the well such that forced convection dominates over free (thermal) convection in the circulating fluid that flows therein, which can further enhance the efficiency of the system.

In embodiments, a thermal insulated piping system can be used for a closed well loop formed by a pipe-in-pipe arrangement where the hotter circulating fluid passes through the same wellbore as the cooler circulating fluid. The thermal insulated piping system can employ vacuum insulated pipe, vacuum insulated polymer type tubing, polymer insulated tubing, and insulating polymer lined tubing. The thermal insulated piping system can also employ composite pipe where an outer layer brings the tubing strength and chemical resistance and mechanical integrity with a thermal insulating inner coating. The pipe-in-pipe arrangement can be part of a vertical section where the wellbore is drilled in a generally vertical direction into a formation. Alternatively or additionally, the pipe-in-pipe arrangement as described herein can be part of a non-vertical section where the wellbore is drilled in a non-vertical direction into a formation, such as in a curved and/or horizontal trajectory.

In order to characterize the system, a thermal model of a geothermal well was built using the well configuration of Table 1 below.

TABLE 1

| Well and formation configuration | |
| --- | --- |
| Well Depth (md) | 8,000 m |
| Well Depth (TD) | 4,000 m |
| Bottom Hole Temp | 220° C. |
| Well OD | 8½ in |
| Formation Thermal Cond | 3 W/m K |
| Tubing ID | 3½ in |
| Choke Pressure | 50 psi |
| Fluid | Water |
| Flow | Turbulent |

The thermal model was used to perform four different simulations as summarized in Table 2 below. The four different simulations covered the following scenarios for the pipe-in-pipe system of the geothermal well: i) a thermal non-insulated piping system (steel production tubing with an outside diameter of 4 inches) for the inner pipe of the pipe-in-pipe system of the geothermal well; ii) a thermal insulated piping system that employs insulating polymer lined pipe with outside diameter of 4 inches for the inner pipe of the pipe-in-pipe system of the geothermal well; iii) a thermal insulated piping system that employs insulating polymer lined pipe with outside diameter of 5 inches for the inner pipe of the pipe-in-pipe system of the geothermal well; and iv) a thermal insulated piping system that employs a vacuum insulated pipe with outside diameter of 4.5 inches for the inner pipe of the pipe-in-pipe system of the geothermal well. The thermal conductivity of the steel production tubing is 50 W/m K. The thermal conductivity of the insulating polymer lined pipe is 0.2 W/m K. The thermal conductivity of the vacuum insulated pipe is 0.02 W/m K. In all four scenarios, the outer pipe of the pipe-in-pipe system of the geothermal well had an inner diameter of 8.5 inches. The thermal power assumes 100% efficiency and the working fluid is cooled to 20° C. The results are summarized in Table 2. The production temperature is the temperature of the working fluid (water) at the surface as it exits the pipe-in-pipe system. The thermal power is the maximum thermal power of the working fluid (water) at the surface as it exits the pipe-in-pipe system. It is evident that the material and insulation characteristics of the pipe-in-pipe system is critical to the system performance.

TABLE 2

| Summarized results for simulations that show the impact of thermal insulated piping systems | | | | |
| --- | --- | --- | --- | --- |
| Material | OD (in) | Conductivity (W/m K) | Production Temperature (° C.) | Thermal Power (kW) |
| Steel | 4 | 50 | 26 | 83 |
| Insulating Polymer | 4 | 0.2 | 58 | 268 |
| | 5 | 0.2 | 99 | 893 |
| Vacuum Pipe | 4.5 | 0.02 | 139 | 2,250 |

Figure 9:
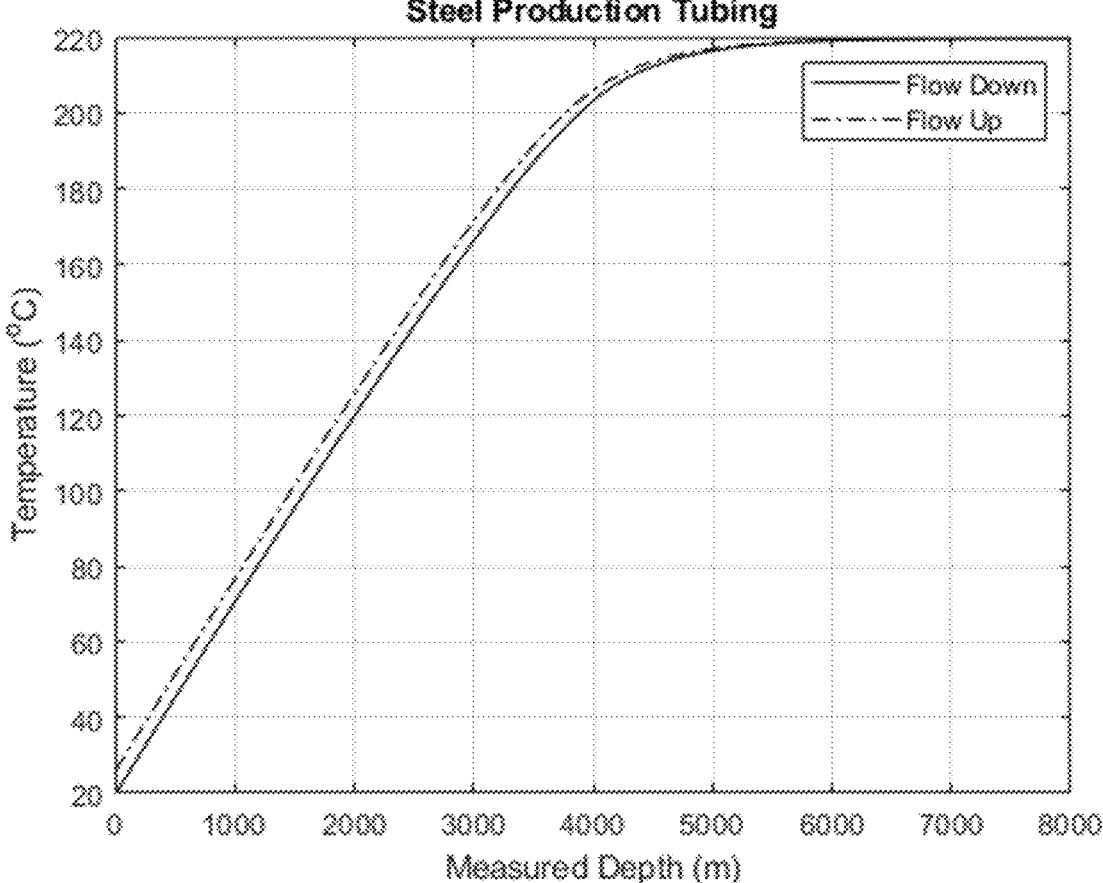
FIG. 9 is a plot of working fluid temperature as a function of measured depth in two different flow paths (flow down the inner pipe, and flow up the annulus between the inner pipe and the outer pipe) in a pipe-in-pipe system as generated by a first simulation. This first simulation employs a thermal non-insulated piping system (steel production tubing with an outside diameter of four (4) inches) for the inner pipe of the pipe-in-pipe system of the geothermal well.

FIG. 9 is a plot of working fluid temperature as a function of measured depth in the two different flow paths (flow down the inner pipe, and flow up in the annulus between the inner pipe and the outer pipe) in the pipe-in-pipe system as generated by the first simulation. This first simulation employs a thermal non-insulated piping system (steel production tubing with an outside diameter of 4 inches) for the inner pipe of the pipe-in-pipe system of the geothermal well. The first simulation results in a production temperature of 26° C. and a thermal power of 83 kW.

Figure 10:
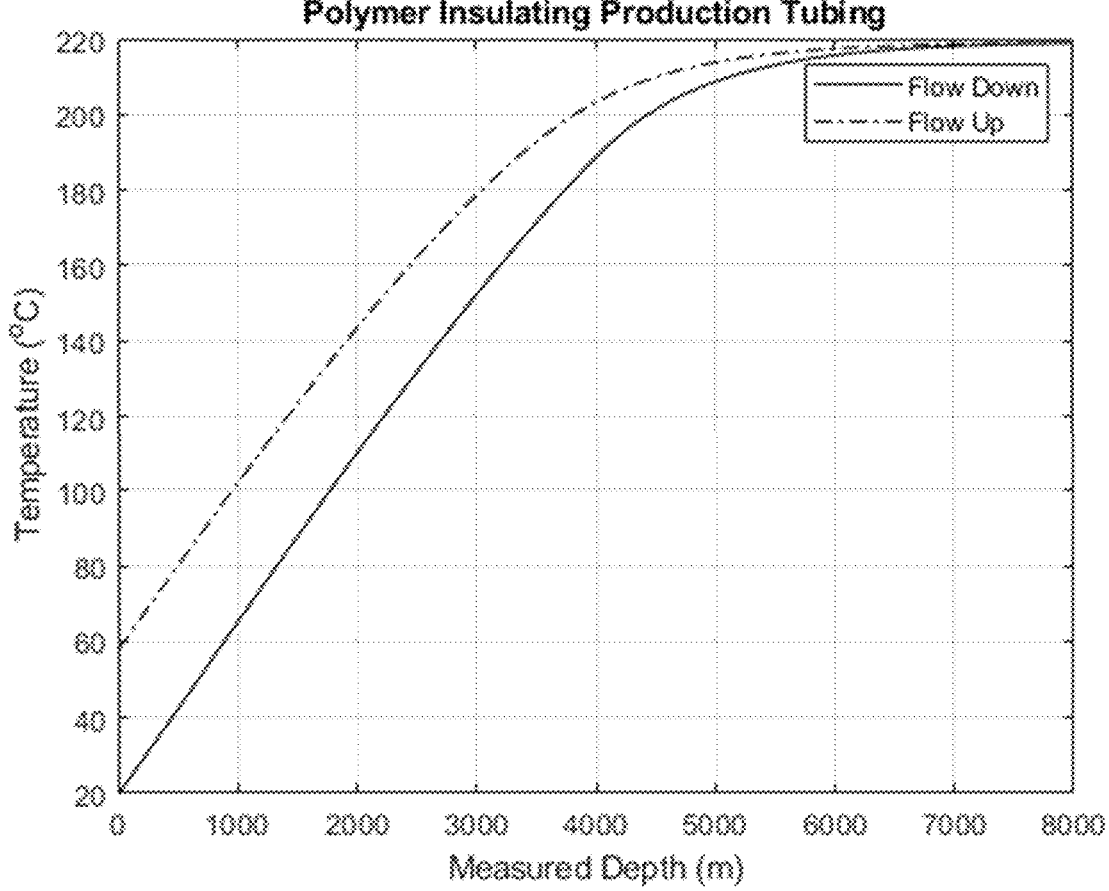
FIG. 10 is a plot of working fluid temperature as a function of measured depth in two different flow paths (flow down the inner pipe, and flow up the annulus between the inner pipe and the outer pipe) in a pipe-in-pipe system for a second simulation. This second simulation employs a thermal insulated piping system that employs thermally-insulating polymer lined pipe (see FIG. 6) with an outside diameter of four (4) inches for the inner pipe of the pipe-in-pipe system of the geothermal well.

FIG. 10 is a plot of working fluid temperature as a function of measured depth in the two different flow paths (flow down the inner pipe, and flow up in the annulus between the inner pipe and the outer pipe) in the pipe-in-pipe system for the second simulation. This second simulation employs a thermal insulated piping system that employs thermally-insulating polymer lined pipe with an outside diameter of 4 inches for the inner pipe of the pipe-in-pipe system of the geothermal well. The second simulation results in a production temperature of 58° C. and a thermal power of 268 kW.

Figure 11:
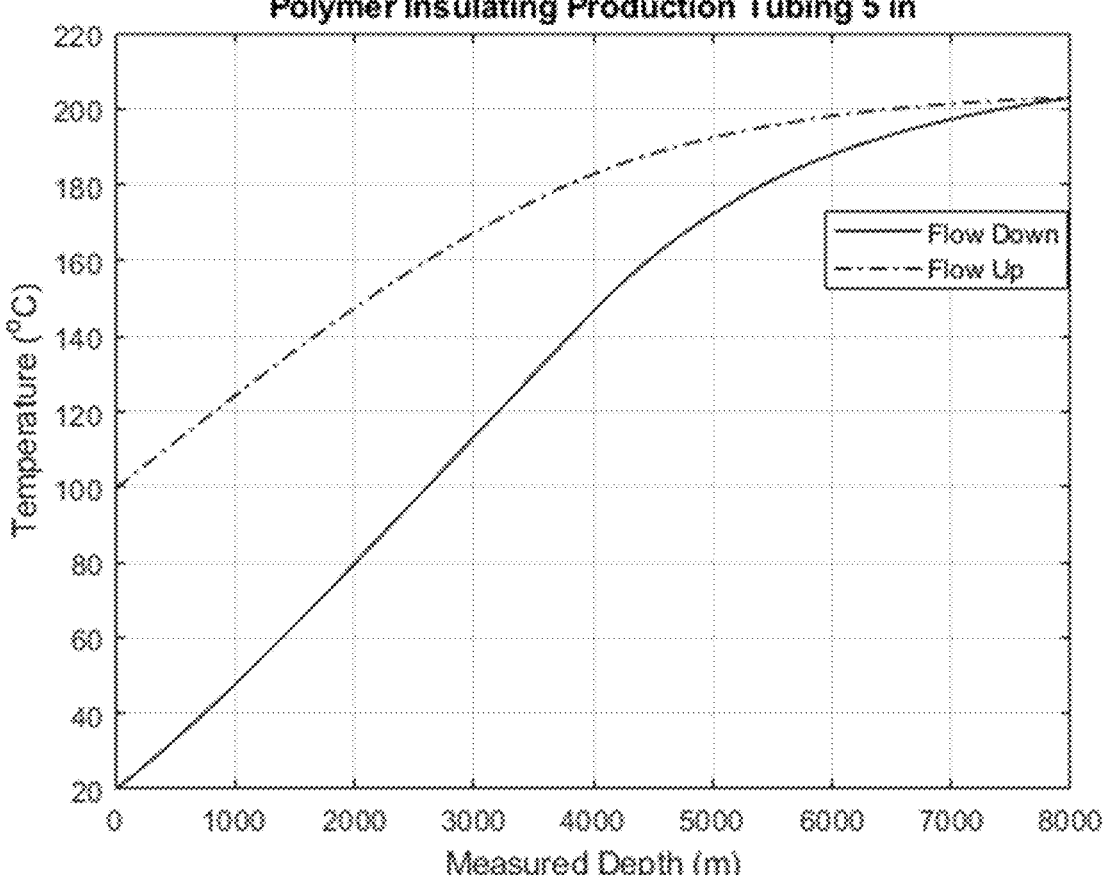
FIG. 11 is a plot of working fluid temperature as a function of measured depth in two different flow paths (flow down the inner pipe, and flow up the annulus between the inner pipe and the outer pipe) in a pipe-in-pipe system for a third simulation. This third simulation employs a thermal insulated piping system that employs thermally-insulating polymer lined pipe (see FIG. 6) with an outside diameter of five (5) inches for the inner pipe of the pipe-in-pipe system of the geothermal well.

FIG. 11 is a plot of working fluid temperature as a function of measured depth in the two different flow paths (flow down the inner pipe, and flow up in the annulus between the inner pipe and the outer pipe) in the pipe-in-pipe system for the third simulation. This third simulation employs a thermal insulated piping system that employs thermally-insulating polymer lined pipe with an outside diameter of 5 inches for the inner pipe of the pipe-in-pipe system of the geothermal well. The third simulation results in a production temperature of 99° C. and a thermal power of 893 kW.

Figure 12:
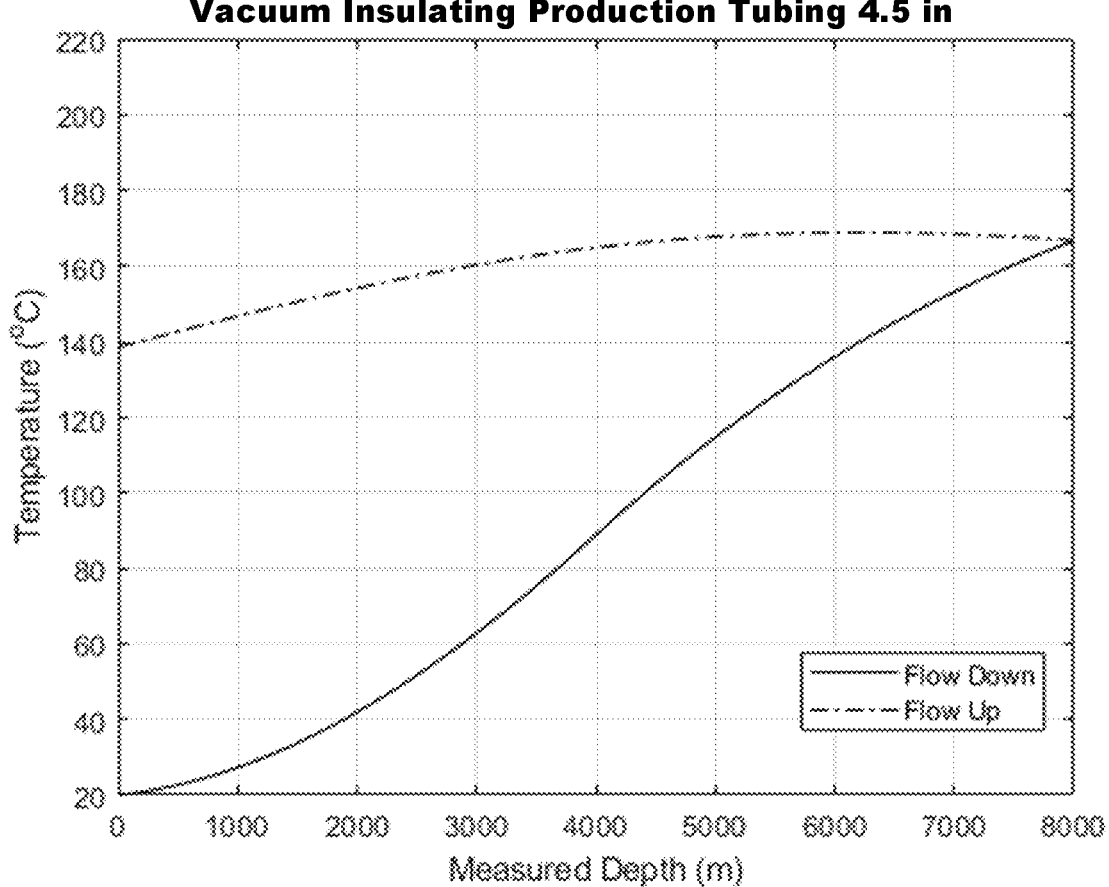
FIG. 12 is a plot of working fluid temperature as a function of measured depth in two different flow paths (flow down the inner pipe, and flow up the annulus between the inner pipe and the outer pipe) in a pipe-in-pipe system for a fourth simulation. This fourth simulation employs a thermal insulated piping system that employs a vacuum insulated pipe (see FIG. 8) with an outside diameter of 0.5 inches for the inner pipe of the pipe-in-pipe system of the geothermal well.

FIG. 12 is a plot of working fluid temperature as a function of measured depth in the two different flow paths (flow down the inner pipe, and flow up in the annulus between the inner pipe and the outer pipe) in the pipe-in-pipe system for the fourth simulation. This fourth simulation employs a thermal insulated piping system that employs a vacuum insulated pipe with an outside diameter of 4.5 inches for the inner pipe of the pipe-in-pipe system of the geothermal well. The fourth simulation results in a production temperature of 139° C. and a thermal power of 2250 kW.

There have been described and illustrated herein several embodiments of closed well loops that extract heat from a subterranean formation and geothermal systems that employ such closed well loops. While particular configurations have been disclosed in reference to the trajectory and design of the closed well loop, it will be appreciated that other configurations could be used as well. It will therefore be appreciated by those skilled in the art that yet other modifications could be made to the provided invention without deviating from its spirit and scope as claimed.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claims expressly uses the words 'means for' together with an associated function.

What is claimed is:

1. A closed well loop for a geothermal system, the closed well loop comprising:

a well that traverses a subterranean formation to extract heat from the subterranean formation, wherein the well includes a vertical section and at least one lateral section that extends laterally and downward away from the vertical section, wherein the at least one lateral section has a toe segment that is located at, or extends to, a depth below a bottom of the vertical section, wherein the vertical section includes an inner pipe, wherein the inner pipe is supported inside an outer pipe in a pipe-in-pipe arrangement, wherein the inner pipe extends to a depth in the vertical section below an intersection of the at least one lateral section and the vertical section, wherein the inner pipe has an interior flow channel, wherein the interior flow channel defines a first flow path for a circulating working fluid, wherein an annulus between the inner pipe and the outer pipe defines a second flow path for the circulating working fluid, wherein the inner pipe includes a thermally-insulative piping system, wherein the thermally-insulative piping system reduces an amount of heat transferred from the circulating working fluid at a higher temperature to the circulating working fluid at a lower temperature, and wherein the circulating working fluid flows in the first flow path and the second flow path within the well;

an isolation packer disposed within the vertical section, wherein the at least one lateral section intersects the vertical section above the isolation packer; and at least one lateral injection manifold that extends laterally and downward from the vertical section and intersects the toe segment of a corresponding lateral section, wherein the at least one lateral injection manifold intersects the vertical section below the isolation packer.

2. The closed well loop according to claim 1, wherein:

at least part of the at least one lateral section is configured to support convective circulation of the circulating working fluid.

3. The closed well loop according to claim 1, wherein:

the thermally-insulative piping system includes a continuous layer of thermally-insulating material applied to or otherwise disposed about an inner diameter surface of the inner pipe for at least part of the vertical section.

4. The closed well loop according to claim 1, wherein:

the thermally-insulative piping system includes a continuous layer of thermally-insulating material applied to or otherwise disposed about an outer diameter surface of the inner pipe for at least part of the vertical section.

5. The closed well loop according to claim 1, wherein:

the thermally-insulative piping system includes a vacuum insulated pipe; and the vacuum insulated pipe forms the inner pipe for at least part of the vertical section.

6. The closed well loop according to claim 1, wherein:

the first flow path defined by the interior flow channel of the inner pipe is configured to carry the circulating working fluid at the lower temperature downward within the well from a surface toward a hot zone of the subterranean formation; and the second flow path defined by the annulus between the inner pipe and the outer pipe is configured to carry the circulating working fluid at the higher temperature, the circulating working fluid at the higher temperature having been heated by thermal energy extracted from the hot zone of the subterranean formation, upward within the well away from the hot zone of the subterranean formation toward the surface.

7. The closed well loop according to claim 1, wherein:

the outer pipe includes pipe that is part of casing that lines a wellbore wall of the vertical section.

* * * * *